April 18, 1944.  J. E. MULHEIM  2,347,059
DAMPER
Filed Jan. 29, 1942
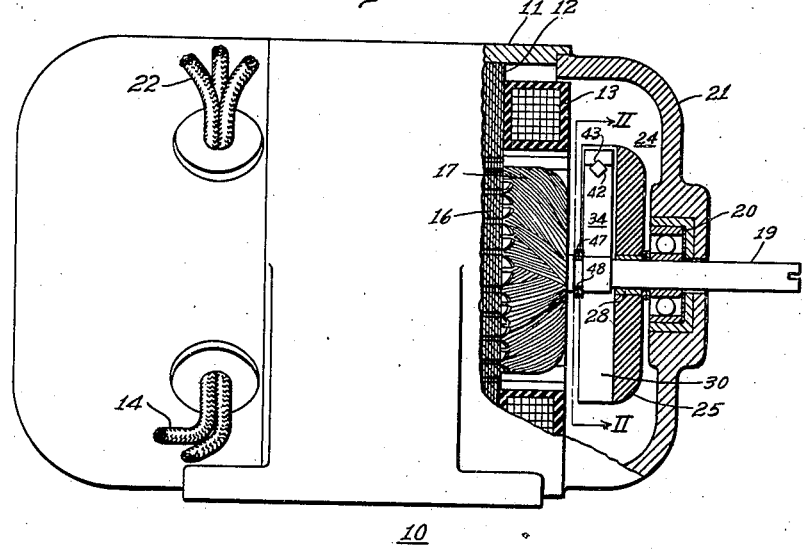
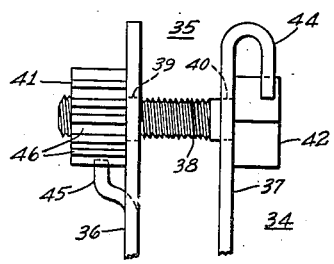
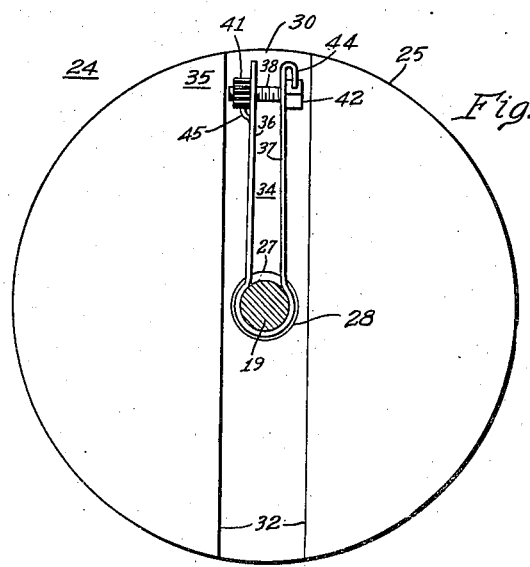
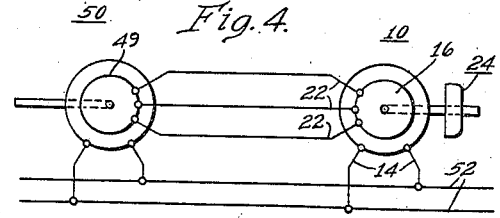
WITNESSES:
C. J. Weller.
F. V. Giolma
INVENTOR
Joseph E. Mulheim.
BY
ATTORNEY Patented Apr. 18, 1944

2,347,059

UNITED STATES PATENT OFFICE 2,347,059

DAMPER

Joseph E. Mulheim, Lima, Ohio, assignor to Westinghouse Electric & Manufacturing Company, East Pittsburgh, Pa., a corporation of Pennsylvania Application January 29, 1942, Serial No. 428,711

5 Claims. (Cl. 74—574)

My invention relates, generally, to dampers and it has reference, in particular, to dampers for motors or receivers used in synchro-tie systems and the like.

Generally stated, it is an object of my invention to provide a damper for synchro-tie motors which is simple and inexpensive to manufacture and which is effective in operation.

More specifically, it is an object of my invention to provide for damping oscillations of a motor in a synchro-tie system by means of an independent rotatable mass connected to the motor shaft through a yieldable frictional connection.

It is also an object of my invention to provide a lost motion connection between a shaft and a flywheel rotatable in a synchro-tie motor and a flywheel rotatable relative to the shaft so as to damp out oscillations of the motor shaft.

Another object of my invention is to utilize a relative simple clip for securing a yieldable lost motion connection between a shaft and a damper flywheel rotatably mounted thereon.

A further object of my invention is to provide an easily adjustable torsional damper mechanism for preventing a synchro-tie motor from "overshooting" the proper operating position.

It is another object of my invention to provide a yieldable frictional lost motion connection between a rotatable shaft and a flywheel rotatable relative to the shaft so as to prevent excessive rotation of the shaft in response to a predetermined yieldable rotational force.

Other objects will in part be obvious and will in part be explained hereinafter.

In accordance with my invention a flywheel is rotatably mounted on the shaft of a synchro-tie receiving motor which is electrically connected to a transmitting motor of a similar type so as to be operated in accordance with operations of the transmitting motor. The flywheel is provided with a relatively narrow diametrical slot on one face thereof. A resilient spring clip secured about the shaft and having a predetermined frictional engagement therewith is positioned in the slot in the flywheel so that the clip may move relative to the flywheel through a relatively small angle until the end thereof strikes the sides of the slot. Further relative motion of the flywheel and shaft results in slippage of the clip about the shaft dissipating kinetic energy. A yieldable damped lost motion connection is thus provided between the shaft and the flywheel which prevents oscillations of the motor shaft when it moves in response to predetermined movements of the transmitting motor.

For a more complete understanding of the nature and scope of my invention, reference may be had to the accompanying detailed description which may be read in connection with the accompanying drawing in which:

Figure 1 is a partly sectioned side elevational view of a synchro-tie motor embodying the principal features of the invention;

Fig. 2 is an enlarged sectional view taken along the line II—II of Fig. 1;

Fig. 3 is an enlarged partial view of the clip shown in Fig. 2; and

Fig. 4 is a diagrammatic view of a synchro-tie system illustrating an application of the invention.

Referring to Figure 1, the reference numeral 10 may denote, generally, a motor of the synchro-tie type comprising, a frame 11 having a stator 12 mounted therein and provided with stator windings 13 which may be energized by connecting the leads 14 to a suitable source. A rotor 16 having rotor windings 17 positioned thereon may be rotatably mounted within the stator by means of a shaft 19 supported by bearing 20 positioned in the end bracket 21. Electrical connections to the rotor windings may be made in a manner well known to the art by means of the terminal leads 22.

In order to prevent the rotor 16 from "overshooting" and oscillating when a predetermined electrical impulse is applied to the rotor windings 17 from a transmitting synchro-tie motor, means such as the damper denoted, generally, by the numeral 24 may be utilized. Referring to Figs. 1 through 3 it will be seen that the damper 24 may comprise, generally, a disc or flywheel 25 of suitable inertia, rotatably mounted on the motor shaft 19. A bearing 27 may be positioned in a central opening 28 in the flywheel so as to permit the flywheel to move freely relative to the motor shaft. The flywheel may also be provided with a relatively narrow diametrical slot 30 having side walls 32.

For the purpose of providing a yieldable frictional lost motion connection between the flywheel 25 and the shaft 19, so as to allow limited relative movement of the shaft and flywheel with but slight restraint, and greater relative movement under conditions of greater restraint, so as to provide for dissipating the kinetic energy of the flywheel and shaft under varying operating conditions, means such as the clip denoted, generally, by the numeral 34 may be provided. The clip may comprise a suitable length of a relatively thin spring-like material such as spring steel, phosphor bronze or the like of a substantially U-shape. The central portion of the clip 34 may be suitably formed to provide a relatively close fit about the shaft 19 and the ends of the clip may be fastened together to provide a predetermined frictional torque between the shaft and the clip.

Adjusting means 35 may be provided for connecting the upstanding side portions 36 and 37 of the clip adjacent the ends thereof, if desired, to vary the frictional engagement of the clip 34 with the shaft 19, so as to provide slippage between the clip and shaft at different torque values. A screw 38 may be positioned in suitable openings 39 and 40 adjacent the ends of the clip having a nut 41, whereby the distance between the ends of the clip may be varied. The screw 38 may be provided with a substantially rectangular head portion 42 which may be secured by being positioned in a substantially V-shaped slot 43 in a bent over portion 44 of one side of the clip 34.

Suitable means may be provided on the other side of the clip for retaining the nut 41, such as, for example, the tongue portion 45 which may be deformed from a side portion of the clip so as to project into grooves 46 in the nut 41 to lock it in position. The distance between the ends of the clip 34 may be varied by pressing the ends together so as to free the tongue 45 from the groove in the nut 41 whereupon the nut may be rotated to a new position in which it may be secured by means of the tongue 45 when the sides of the clip are freed. Washers 47 may be interposed between the clip and a shoulder 48 on the shaft 19 to provide the proper spacing of the damper and prevent axial movement of the flywheel.

Referring to Fig. 4, the numeral 10 denotes, as hereinbefore, a receiving synchro-tie motor wherein the windings of the rotor 16 may be connected by means of leads 22 to the windings on a rotor 49 of a transmitting synchro-tie motor 50. The stator windings of both the transmitting and receiving motors may be connected to a suitable source by means of conductors 52. When the rotor 49 of the transmitting motor 50 is rotated through a predetermined angle, force corresponding thereto is applied to the rotor 16 of the receiving motor 10 which tends to turn the rotor 16 through the same angle. However, since the electrical connection between the rotors 49 and 16 has a certain degree of resiliency, the rotors 49 and 16 may operate as though connected by a spring. For example, because of its physical inertia the rotor 16 may be somewhat sluggish in responding to the initial movement of the rotor 49, and after the rotor 49 has ceased to rotate, the rotor 16 may continue to rotate past the position corresponding to the final position of the rotor 49, "overshooting" the desired position and then continuing to oscillate backwards and forwards about the desired position for some time before coming to rest if some means of damping is not provided. This oscillation is undesirable, and it is the purpose of the damper 24 to damp out these oscillations and bring the rotor 16 to the desired operation position in the minimum of time with the maximum of accuracy.

In operation, when the rotor 16 is moved in response to an electrical impulse from the rotor of the transmitting motor 50, the shaft 19 may move relatively freely through a relatively small angle determined by the clearance between the ends of the spring clip 34 and the sides 32 of the slot 30. The frictional force between the bearing 27 of the flywheel 25 and the shaft 19 provides sufficient damping for very small oscillations such as occasioned by movement of the rotor 16 through an angle less than that necessary to cause rotation of the flywheel 25.

When the rotor 16 is caused to move through a larger angle the ends of the spring clip 34 engage the sides of the slot 30 deforming or bending the clip slightly, and causing the flywheel 25 to rotate at least partially with the shaft 19. The amount of rotation of the flywheel with the shaft is determined largely by the degree of frictional engagement of the clip 34 with the shaft 19, the degree of which should be varied under different operating conditions to provide an effective damper. This frictional engagement may be properly adjusted to provide the necessary amount of slippage between the clip and the shaft best suited to the particular operating conditions to obtain the maximum damping. When the rotor 16 tends to come to rest after rotating in response to an electrical impulse from the rotor 49 of the transmitting motor, the end of the clip strikes the side of the slot 30 so that the clip bends slightly and the flywheel is restrained in its motion by the frictional torque between the clip and the shaft, in addition to the friction between the shaft and the bearing 28. As a result the clip is turned on the shaft through a relatively small angle during which the frictional energy is dissipated. When the shaft tends to rotate in the reverse direction a reversing torque is applied to the flywheel by the clip, producing further slippage and a further dissipation of stored energy. Oscillations of the shaft 19 are thus effectively damped. Such a clip provides a substantially constant and uniform damping torque under all operating conditions.

From the above description and the accompanying drawing it will be apparent that I have provided a damper for synchro-tie motors that is both simple and inexpensive to manufacture and effective in operation. Adjustments of the damper to provide different degrees of damping under different operating conditions may be easily effected and once effected the damping effect is substantially constant.

Since certain changes may be made in the above description and different embodiments of the invention may be made without departing from the spirit thereof, it is intended that all of the matter contained in the above description shall be considered illustrative and not in a limiting sense.

I claim as my invention:

1. A damper for a synchro-tie motor having a stator and an armature mounted on a shaft comprising, a flywheel rotatably associated with the shaft, a resilient spring member projecting from the shaft having a predetermined frictional engagement therewith, and means on the flywheel cooperative with a portion of the spring member for providing a lost motion connection between the spring member and the flywheel whereby a resilient lost motion connection is provided between the shaft and the flywheel.

2. A torsional damper for a rotatable shaft comprising, a flywheel rotatably mounted on the shaft, resilient means positioned on the shaft to provide a resilient frictional lost motion connection between the flywheel and the shaft, and means on said resilient means to vary the force transmitted between the flywheel and said means.

3. A synchro-tie motor damper comprising, a flywheel having a diametrical slot rotatably mounted on the shaft of the motor, and a clip frictionally engaging the shaft positioned in the slot having a flexible portion projecting radially from the shaft for providing a resilient connection between the flywheel and the shaft.

4. A damper for a shaft rotatable through a predetermined angle in response to a predetermined turning force comprising, a flywheel rotatable about the axis of the shaft, means comprising a spring arm mounted on the shaft and having frictional engagement therewith cooperative with fixed means on the flywheel to provide a resilient damped connection therebetween, additional means associated with the first mentioned means adjustable to vary the damping effect, and means to maintain a predetermined adjustment of said additional means.

5. A damper for a synchro-tie motor having a rotatable shaft comprising, a flywheel rotatably mounted on the shaft having a diametrical slot on one side, and a clip formed from a relatively thin strip of resilient material secured about the shaft to provide a predetermined frictional engagement therewith and having a resilient arm portion projecting radially therefrom, said clip being positioned in the slot so that the resilient arm portion provides a damped resilient lost motion connection between the flywheel and the shaft.

JOSEPH E. MULHEIM.